United States Patent Office 3,068,303
Patented Dec. 11, 1962

3,068,303
LOW SURFACE AREA ALPHA ALUMINA CATALYST SUPPORT FOR THE SELECTIVE HYDROGENATION OF HYDROCARBONS
John N. Pattison, Louisville, Ky., assignor to Chemetron Corporation, Chicago, Ill., a corporation of Delaware
No Drawing. Filed July 27, 1959, Ser. No. 829,501
12 Claims. (Cl. 260—677)

This invention relates to a novel catalyst useful in the selective hydrogenation of unsaturated hydrocarbons and to methods for producing such catalysts. More particularly, this invention relates to a catalyst useful in the selective hydrogenation of acetylenic hydrocarbons in gas streams containing a major proportion of olefins. More specifically, the invention relates to an improved catalyst containing cobalt oxide, molybdenum oxide and nickel oxide on an alpha alumina carrier which is useful in the selective hydrogenation of acetylenes in raw ethylene streams.

Because of the relative instability of the triple bond, acetylenic hydrocarbons may be hydrogenated more readily than hydrocarbons containing double bonds and selective hydrogenation of acetylenes in a gas mixture containing olefins is possible by utilization of a catalyst of appropriate activity to cause the hydrogenation of acetylenes to occur at a much greater rate than the hydrogenation of the olefins. The problem is rendered much more complex when only small amounts of acetylenes are present in a gas mixture and when it is necessary to completely hydrogenate the acetylenes without appreciably lowering the olefin content in order to produce a gas mixture suitable for use in polymerization reactions. The problem is even more complex when the raw olefin stream contains sulfur compounds. In commercial operation, however, it has been found that gas mixtures consisting essentially of olefins and hydrogen for the production of polyethylenes should not contain in general more than about 25 parts of acetylene per million parts of the mixture. Mixtures containing higher acetylene concentrations have been found to be unsuitable for the polymerization reaction.

It is an object of this invention to provide a catalyst which is capable of hydrogenating small amounts of acetylenes in olefin mixtures in such a way that the reaction proceeds virtually to completion at high space velocity to reduce the acetylene content to a few parts per million, and since any olefins which are hydrogenated in the gas mixture containing the same are effectively lost, a related object is to provide an acetylene hydrogenation catalyst which is relatively inactive in promoting hydrogenation of olefins even in mixtures containing a major proportion of olefins. Another object is to provide a physically rugged catalyst which will effectively withstand polymer formation and/or produce less polymer formation thereon, thereby attaining longer life. A further object is to provide a catalyst which will operate at extremely high space velocities in a sulfur-containing olefin stream and exhibit good selectivity without the benefit of steam. A further object is to provide a catalyst which is relatively inactive in polymer formation in the olefin stream and produces relatively little carbon deposit on the catalyst, thereby attaining longer effective life and maintaining mechanical strength. Another object is to provide a catalyst which has a relatively long effective life, good resistance to thermal shock, high mechanical strength even after long use and resistance to the effect of poisons, such as carbon monoxide and sulfur compounds which are usually present in hydrocarbon mixtures derived from petroleum. An additional object of the invention is to provide a catalyst which is resistant to sulfur poisoning and which is effective in selectively reducing acetylenes in olefin streams containing relatively large quantities of gaseous sulfur compounds. Another object is to provide a catalyst which may be readily regenerated after continued use and restored virtually to its original activity with its physical properties unimpaired. These and other objects will be apparent from and are achieved in accordance with the following disclosure.

I have discovered that a superior selective hydrogenation catalyst may be formed by impregnating or otherwise applying to an alumina carrier of low surface area a combination of cobalt oxide, molybdenum oxide and nickel oxide. This combination of metals is preferably applied to the alumina in the form of oxides or salts which on calcining at temperatures in the range of 300° to 1100° F. are converted to oxides. During the initiation of the selective hydrogenation reaction in an olefin stream containing hydrogen, the metal oxides may be reduced to a lower oxidation state or to the respective metals on the alumina and serve as the active components of a selective hydrogenation catalyst.

Cobalt-molybdenum catalysts on alumina carriers have been used in the past for selective hydrogenation of acetylenes in olefin streams. I have discovered that the substitution of nickel for a portion of the cobalt in a composite catalyst having active ingredients upon a low area support leads to an unexpected increase in activity. A comparison of a cobalt-molybdenum catalyst on alumina with a cobalt-nickel-molybdenum catalyst on the same carrier (wherein part of the cobalt is replaced by an equivalent amount of nickel) indicates that the cobalt-nickel-molybdenum catalysts are far superior as selective hydrogenation catalysts for effectively removing traces of acetylenes in raw olefin streams.

The relative amounts of cobalt oxide, nickel oxide and molybdenum oxide on the alumina carrier should be controlled within certain definite ranges. The molybdenum oxide may vary from about 1.5% to 5% of the total catalyst weight, the cobalt oxide from 0.1% to 2% of the total catalyst weight and the nickel oxide from 0.1% to 7% of the total catalyst weight.

The relative amounts of catalytic metal oxides and carrier should be controlled within certain ranges in order to obtain the desired selectivity and activity of the catalyst. The percentage of catalytic metals in oxide form to the total catalyst mass should be within the range of about 2% to about 10% by weight. The specific composition depends upon the composition of the gas stream to be treated, the degree of acetylene removal required and the concentration of poisonous materials, such as carbon monoxide and gaseous sulfur compounds in the gas stream.

The carrier for the cobalt, nickel and molybdenum is low surface area alumina of the alpha crystalline form (Alcoa nomenclature) obtained by calcination of one or more of the low temperature forms of alumina. It is important that the surface area of the alumina carrier should be low, less than 10 square meters per gram and preferably about one square meter per gram of alumina or less. The alpha alumina carrier can be used in any conventional shape, such as spheres, tablets, rings or pellets. The alpha alumina should preferably be in anhydrous form, such as that obtained by prior high temperature calcination at temperatures of 1800° to 3500° F. The carrier should contain a relatively large proportion of alpha alumina but smaller amounts of other carrier materials, such as hydraulic cements and clay may be present. Ordinarily silica is the carrier component next to alumina which appears in largest concentration and may be in the range of 10% to 15% of the total carrier weight. Particularly satisfactory for this invention are spheres of calcined (at 2400° F.) alpha alumina sold by the Norton Company. These spheres have a surface area of less than one square meter per gram and have a pore volume of substantially 0 by the carbon tetrachloride method, Anal. Chem., 27, 1963 (1955). These spheres are substantially alpha alumina containing about 11% of silica and traces (0.1% to 0.3%) of iron, magnesium, calcium, sodium, potassium and titanium oxides. X-ray diffraction analysis of the alpha alumina spheres of the Norton Company has shown that silica exists largely as mullite as the major silica-containing constituent. Very small quantities of the silica exist as sillimanite. Other forms of alpha alumina, such as Alcoa T–71 alumina extrusions are satisfactory after reducing to smaller size. The latter are extrusions of three-quarters inch or one inch diameter of essentially 100% alpha alumina. Another highly satisfactory carrier of a somewhat different nature and possessing a surface area of 7.66 square meters per gram and a pore volume of 0.05 cubic centimeter per gram is described in Example 8.

The composition of the carrier material is very important because of the extremely rigorous treatment to which catalysts of this type are subjected. Generally, after beds of acetylene hydrogenation catalysts have been in use two or three weeks polymer deposits are formed upon the surface which render the catalyst less effective. These deposits are burned off by passing steam and air through the catalyst bed at a temperature of about 750° F., and within the bed the temperature may rise as high as 1200° F. due to the heat generated by oxidation of the polymer. Of necessity considerable thermal shock to the catalyst occurs during the two or three day period required for regeneration. Following the steaming treatment the catalyst is ordinarily reduced with hydrogen at a high temperature, and then the temperature is lowered to the operating range of about 400° F. Few carrier materials will withstand such regeneration treatment without physical or chemical breakdown, and this treatment must be repeated every two or three weeks during the life of the catalyst, which must be at least one to three years if the catalyst is to be suitable for commercial use. The alpha-alumina carrier has shown unusual properties in this respect.

The catalytic metals may be applied to the alpha alumina support by spraying the support with a solution of the metals in soluble form or by dipping the carrier into such solution. Each metal can be applied separately from a separate solution or the combination of metals can be applied in one step from a single solution containing soluble forms of the metals. The spraying or dipping procedure is controlled so that selected amounts of the metals are combined with the carrier. The carrier is then heated to a temperature of 300° F. or higher to evaporate the moisture and decompose any salts which are present to form metal oxides.

Although the catalytically active material is described herein as a mixture of cobalt oxide, nickel oxide and molybdenum oxide, it is to be understood that the exact chemical nature of the catalytic material is not known. The metal oxides which are present on the carrier may be merely a mixture of oxides or there may be compound formation between various metal oxides.

The cobalt-nickel-molybdenum catalysts of this invention are preferably prepared by dipping the alpha alumina carrier into a chelate solution of the catalytic metals. Water-soluble salts of cobalt and nickel, such as cobalt nitrate and nickel nitrate hexahydrate, are combined with a chelating agent such as citric acid and diluted with water to about one-half the final volume of the dip solution. The amount of citric acid is governed by a ratio of one mole of citric acid per mole of divalent metal (cobalt and nickel). The desired amount of molybdic acid is dissolved in concentrated aqua ammonia and diluted with water to a volume equal to one-half the final volume of the dip solution. A ratio of two moles of ammonia per mole of $MoO_3$ is employed. The cobalt-nickel solution is then combined with the molybdenum solution to form the dip solution. The chelating agent prevents the formation of a precipitate of insoluble cobalt, nickel, and/or molybdenum salts. The alpha alumina carrier is dipped in the dip solution for a suitable period, approximately one-half hour, then removed, drained and calcined, preferably at a temperature in the range from 600° to 1100° F.

The catalysts of this invention are effective in selectively hydrogenating acetylenic compounds in olefin gas streams under a wide range of conditions to reduce the concentration of acetylenes to 10 p.p.m. or lower. The temperature of the selective hydrogenation can vary from 250° to 600° F., the pressure from 50 to 400 p.s.i.g., the hourly space velocity up to 4000, the steam concentration from 0% to 6% or higher, and organic sulfur content as high as 250 p.p.m. The catalysts are usually resistant to poisoning and can be regenerated many times by oxidation with steam and air without loss of strength or breakage.

The following examples illustrate the preparation of catalysts within the scope of this invention and the use of such catalysts in the selective hydrogenation of olefin streams to remove acetylenes without substantial loss of the olefins and without serious polymer formation and carbon deposit on the catalyst. These examples are provided for the purpose of illustration only and are not intended to limit the invention. It will be apparent to those skilled in the art that numerous modifications in materials, concentrations, times and other operating conditions may be made without departing from the invention. Likewise, equivalent materials may be substituted for those disclosed in the examples without departure from the invention.

EXAMPLE 1

A catalyst containing 0.24% CoO, 2.22% NiO and 4.48% $MoO_3$ on 5/16 inch alpha alumina spheres (BA–109, Norton Company), was prepared according to the following procedure: 31 parts of cobalt nitrate solution containing 17.2% CoO by weight, 121 parts of citric acid (U.S.P.) and 175 parts of nickel nitrate hexahydrate were combined and diluted with 100 parts of water. Then 90 parts of molybdenum trioxide and 76.5 parts of 29% ammonia water were mixed and diluted with 100 parts of water. The cobalt-nickel solution was combined with the molybdenum solution and the alpha alumina spheres were dipped in the resulting solution for 30 minutes, removed and allowed to drain for 20 minutes. The wetted spheres were then dried and calcined at 950° F. for 8 hours.

The catalyst prepared as above gave highly satisfactory performance with a raw ethylene stream at high space velocity of 2400 volumes per hour in the presence of organic sulfur compounds and with or without the benefit of steam. Normally operating without steam in a raw ethylene stream will result in catalyst fouling with heavy carbon deposition but this was not encountered with the catalyst as prepared above. Carbon deposition was very light, with or without steam. When the catalyst was operated with steam, approximately 0.11% carbon deposition occurred in 47 hours of operation. In the absence of steam 0.13% carbon deposition on the catalyst occurred in 120 hours of operation.

In Table I below are data showing the operation of the catalyst prepared as above in a raw ethylene stream containing 27.2% methane, 31.6% ethylene, 38.5% hydrogen, 1.1% propylene, 1.8% carbon monoxide, 0.1% acetylene and 10 parts per million of sulfur as COS. The conditions of the selective hydrogenation operation were 130 p.s.i.g., 2400 S.V. and 6.0% steam.

*Table I*

DATA ON CATALYST CONTAINING 0.24% CoO, 2.22% NiO AND 4.48% $MoO_3$ OPERATING WITH 6% STEAM

| Hrs. on stream | Temp., °F. | Unsaturates hydrogenated, mol percent | $C_2H_2$, p.p.m. In | $C_2H_2$, p.p.m. Out | Remarks |
|---|---|---|---|---|---|
| 5 | 350 | 0.0 | 950 | 3 | Catalyst regenerated and reduced prior to going on stream. |
| 23 | 400 | 1.3 | 950 | 0 | |
| 29 | 450 | 2.6 | 950 | 0 | |
| 47 | 350 | 0.8 | 950 | 0 | |

Table IA below presents data on the same catalyst containing 0.24% CoO, 2.22% NiO and 4.48% $MoO_3$ operating on the same gas stream without the benefit of steam. The reaction was conducted at 130 p.s.i.g., 2400 S.V.

*Table IA*

| Hrs. on stream | Temp., °F. | Unsaturates hydrogenated, mol percent | $C_2H_2$, p.p.m. In | $C_2H_2$, p.p.m. Out | Remarks |
|---|---|---|---|---|---|
| 4 | 350 | 3.6 | 950 | 0 | Catalyst regenerated and reduced prior to going on stream. |
| 72 | 300 | 0.0 | 950 | 19 | |
| 76 | 350 | 0.0 | 1,000 | 5 | |
| 96 | 400 | 0.6 | 1,000 | 2 | |
| 120 | 450 | 1.3 | 1,000 | 1 | |

EXAMPLE 2

A catalyst containing 0.13% CoO, 4.11% NiO and 1.64% $MoO_3$ on one-quarter inch alpha-alumina spheres (SA-203, Norton Company), was prepared by the procedure of Example 1 and tested in a raw ethylene stream containing varying amounts of sulfur as COS in concentration of 20 to 237 p.p.m. This catalyst exhibited excellent performance even at low temperatures and high space velocity. The test data are given in Table II:

*Table II*

DATA OBSERVED ON CATALYST CONTAINING 0.13% CoO, 4.11% NiO AND 1.64% $MoO_3$

Conditions: 175 p.s.i.g. press., 1000 S.V. and 6.0% steam
Gas composition: 31.0% $CH_4$; 32.0% $C_2H_4$; 12.0% $C_3H_6$; 0.7% $C_2H_2$; 14.0% $H_2$; 7.0% $CO_2$; 2.5% CO; 0.5% $O_2$

| Hrs. on stream | Temp., °F. | Unsaturates hydrogenated, mol percent | $C_2H_2$, p.p.m. In | $C_2H_2$, p.p.m. Out | Inlet sulfur, p.p.m. | Remarks |
|---|---|---|---|---|---|---|
| 24 | 350 | 0.4 | 7,200 | 0 | 60 | |
| 30 | 325 | 0.2 | 7,200 | 12 | 60 | |
| 78 | 375 | 0.0 | 7,200 | 0 | 60 | Prior to going on stream, catalyst was regenerated and reduced. |
| 120 | 450 | 1.6 | 7,200 | 2 | 237 | |
| 148 | 375 | 0.0 | 7,200 | 1 | 20 | |
| 195 | 300 | 0.2 | 7,200 | 4 | 20 | |
| 199 | 275 | 0.0 | 7,200 | 14 | 20 | |
| 217 | 300 | 0.0 | 7,200 | 3 | 20 | |

EXAMPLE 3

A catalyst containing 0.15% CoO, 6.88% NiO and 1.70% $MoO_3$ on alpha alumina spheres was prepared by the method of Example 1. The catalyst was tested on the same gas stream described in Example 2 at 175 p.s.i.g., 1000 S.V. and 6% steam. The activity and selectivity of this catalyst were excellent and were commensurate with the increase in nickel content. The catalyst was more active at lower temperature and higher sulfur concentrations than that of Example 2. The test results are given in Table III below:

*Table III*

| Hrs. on stream | Temp., °F. | Unsaturates hydrogenated, mol percent | $C_2H_2$, p.p.m. In | $C_2H_2$, p.p.m. Out | Inlet sulfur, p.p.m. | Remarks |
|---|---|---|---|---|---|---|
| 6 | 350 | 0.9 | 6,600 | 1 | 20 | Catalyst regenerated and reduced prior to going on stream. |
| 26 | 325 | 0.2 | 6,600 | 0 | 20 | |
| 31 | 300 | 0.0 | 6,600 | 0 | 20 | |
| 35 | 275 | 0.0 | 6,600 | 0 | 20 | |
| 39 | 250 | ---- | 6,600 | 80 | 20 | |
| 120 | 350 | 0.0 | 6,600 | 15 | 237 | Increased sulfur concentration. |
| 124 | 375 | 0.0 | 6,600 | 0 | 237 | |
| 147 | 350 | 0.0 | 6,600 | 2 | 237 | |
| 151 | 325 | 0.0 | 6,600 | 43 | 237 | |
| 169 | 350 | 0.1 | 6,600 | 1 | 237 | |

EXAMPLE 4

A catalyst containing 1.54% CoO, 0.18% NiO and 4.04% $MoO_3$ on one-quarter inch alpha alumina spheres (SA-203, Norton Company), was prepared by the method described in Example 1. This catalyst was tested on a commercial raw ethylene gas stream and the following results obtained:

*Table IV*

DATA ON CATALYST: 1.54% CoO, 0.18% NiO AND 4.04% $MoO_3$

Conditions: 210 p.s.i.g. press., 6.0% steam and 600–1200 S.V.
Gas compositions: 51.6% $CH_4$; 19.8% $C_2H_4$; 20.6% $H_2$; 0.4% $C_4H_6$; 5.9% $C_3H_6$; 0.2% $C_2H_2$; 1.5% CO and sulfur free

| Hrs. on stream | Temp., °F. | S.V. | Unsaturates hydrogenated, mol percent | $C_2H_2$, p.p.m. In | $C_2H_2$, p.p.m. Out | Remarks |
|---|---|---|---|---|---|---|
| 5 | 350 | 600 | 0.6 | 1,650 | 0 | Catalyst regenerated and reduced prior to going on stream. |
| 19 | 300 | 600 | 0.0 | 1,650 | 0 | |
| 26 | 250 | 600 | 0.0 | 1,650 | 18 | |
| 72 | 350 | 1,200 | 0.2 | 1,650 | 0 | |
| 96 | 400 | 600 | 0.0 | 1,650 | 0 | |

EXAMPLE 5

A catalyst containing 09.12% CoO; 2.3% NiO and 3.4% $MoO_3$ of one-quarter inch alpha alumina spheres was prepared by the method described in Example 1. This catalyst exhibited excellent performance in the selective hydrogenation of acetylene in a raw ethylene gas stream even at three to four times normal plant space velocity and in the presence of sulfur. The data are given in Table V below:

*Table V*

DATA ON CATALYST: 0.12% CoO, 2.3% NiO AND 3.4% $MoO_3$

Conditions: 70 p.s.i.g. press., 6.0% steam and 1800–2400 S.V.
Gas composition: 43.0% $CH_4$; 29.7% $C_2H_4$; 20.2% $H_2$; 6.3% $C_3H_6$; 0.5% $C_4H_6$; 0.25% $C_2H_2$; and 3 p.p.m. sulfur as COS

| Hrs. on stream | Temp., °F. | S.V. | Unsaturates hydrogenated, mol percent | $C_2H_2$, p.p.m. In | $C_2H_2$, p.p.m. Out | Remarks |
|---|---|---|---|---|---|---|
| 6 | 350 | 1,800 | 0.6 | 2,400 | 0 | Catalyst regenerated and reduced prior to going on stream. |
| 29 | 300 | 1,800 | 0.0 | 2,400 | 21 | |
| 48 | 350 | 2,400 | 0.2 | 2,400 | 0 | |
| 72 | 350 | 1,800 | 0.6 | 2,350 | 0 | |
| 78 | 500 | 1,800 | 0.4 | 2,350 | 0 | |

EXAMPLE 6

A conventional cobalt-molybdenum-alumina catalyst containing 2.02% CoO and 3.98% $MoO_3$ on alpha alumina spheres was tested in the selective hydrogenation of acetylene in the raw commercial ethylene stream at 175 p.s.i.g., 500 S.V. and 6.0% steam. The test data are given in Table VI. It is seen that the catalyst was inactive under the test conditions.

Table VI

ACTIVITY DATA ON CATALYST CONTAINING 2.02% CoO AND 3.98% $MoO_3$

Conditions: 175 p.s.i.g., press., 500 S.V. and 6.0% steam
Gas composition: 7.0% $CO_2$; 31.0% $CH_4$; 12% $C_3H_6$; 14.0% $H_2$; 32.0% $C_2H_4$; 2.5% CO; 0.5% $O_2$; 0.7% $C_2H_2$ and 142 p.p.m. sulfur as COS

| Hrs. on stream | Temp., °F. | S.V. | $C_2H_2$, p.p.m. In | $C_2H_2$, p.p.m. Out | Remarks |
|---|---|---|---|---|---|
| 8 | 350 | 500 | 4,400 | 4,400 | Catalyst regenerated and reduced prior to going on stream. |
| 72 | 450 | 500 | 4,400 | 4,400 | |

In distinct contrast the following example shows the results obtained in similar operations with the catalyst of this invention.

EXAMPLE 7

A catalyst containing 0.76% CoO, 0.82% NiO and 3.1% $MoO_3$ on alpha alumina spheres was tested against the same gas stream as in Example 6 under the same conditions, namely, 175 p.s.i.g., 500 S.V. and 6.0% steam. The following results were obtained:

Table VII

| Hrs. on stream | Temp., °F. | S.V. | $C_2H_2$, p.p.m. In | $C_2H_2$, p.p.m. Out | Remarks |
|---|---|---|---|---|---|
| 6 | 350 | 500 | 4,400 | 282 | Catalyst regenerated and reduced prior to going on stream. |
| 26 | 450 | 500 | 4,400 | 40 | |

It will be noted that the cobalt-nickel-molybdenum formulation led to increased activity under the conditions of the test, and that the catalyst was highly efficient in removing acetylene under conditions in which the conventional cobalt-molybdenum-alumina catalyst was inactive.

EXAMPLE 8

A catalyst containing 0.34% CoO, 2.2% NiO and 4.18% $MoO_3$ on ¼″ x ¼″ pellets was prepared by the method described in Example 1. The carrier pellets consisted of 60% alpha alumina, 35% CA-25 calcium aluminate (Aluminum Company of America) and 5% clay (R & L) calcined at 2200° F. This catalyst exhibited good performance in a raw ethylene stream containing 27.2% methane, 31.6% ethylene, 38.5% hydrogen, 1.1% propylene, 1.8% carbon monoxide, 0.1% acetylene and 5 p.p.m. of sulfur as COS. The conditionsh of study were 130 p.s.i.g., 2400 S.V. and 6.0% steam.

The calcium aluminate had the following analysis:

| | Percent |
|---|---|
| $Al_2O_3$ | 79. |
| $SiO_2$ | 0.1 |
| $Fe_2O_3$ | 0.3 |
| $Na_2O$ | 0.5 |
| MgO | 0.4 |
| CaO | 18. |
| Loss on ignition at 1100° C. | 1.5 |

The empirical formula may be considered to be $$CaO \cdot 2.5Al_2O_3$$

or a mixture of monocalcium aluminate ($CaO \cdot Al_2O_3$) and pentacalcium trialuminate ($5CaO \cdot 3Al_2O_3$).

In Table VIII below are data showing the operation of the catalyst prepared as above.

Table VIII

DATA ON CATALYST CONTAINING 0.34% CoO, 2.2% NiO AND 4.18% $MoO_3$

| Hrs. on stream | Temp, °F. | Unsaturates hydrogenated, mol percent | $C_2H_2$, p.p.m. In | $C_2H_2$, p.p.m. Out | Remarks |
|---|---|---|---|---|---|
| 4 | 350 | 0.1 | 1,040 | 0 | Catalyst regenerated and reduced prior to going on stream. |
| 10 | 450 | 1.9 | 1,040 | 0 | |
| 25 | 400 | 2.2 | 1,040 | 0 | |
| 29 | 350 | 0.0 | 1,040 | 2 | |
| 36 | 300 | 0.0 | 1,040 | 55 | |

In all of the foregoing examples it will be noted that the catalyst was subjected to a regeneration and reduction step prior to the test. This was done to simulate production practice in the commercial use of the catalyst of this invention. The regeneration procedure consisted of subjecting the catalyst to an oxidizing mixture of oxygen, nitrogen and steam at 850° F. The reduction step consisted in passing a slow stream of hydrogen at a temperature of 850° F. through the catalyst for eight hours. Actually this reduction step may in many cases be effected by conducting the gas stream to be purified over the catalyst since this stream has reducing properties.

What is claimed as new and is desired to be secured by Letters Patent of the United States is:

1. A catalyst that upon reduction is suitable for the selective hydrogenation of acetylenic compounds in the presence of olefins and exhibiting low polymer-forming properties, which comprises 0.1% to 2% CoO, 0.1% to 7% NiO and 1.5% to 5% $MoO_3$ supported on a carrier comprising a major proportion of alpha alumina, said carrier having a surface area not greater than ten square meters per gram, wherein the percentages are calculated on the finished catalyst weight.

2. A catalyst as defined in claim 1 wherein the combined weight of cobalt oxide, nickel oxide and molybdenum oxide is between about 2% and about 10% of the total weight of the finished catalyst.

3. A catalyst as defined in claim 2 wherein the alpha alumina is substantially anhydrous.

4. A catalyst as defined in claim 3 wherein the carrier has a surface area of not more than about one square meter per gram.

5. A catalyst as defined in claim 4 wherein not more than 15% of the weight of the carrier is silica.

6. A catalyst that upon reduction is suitable for the selective hydrogenation of acetylenic compounds in the presence of olefins and exhibiting low polymer-forming properties, which comprises 0.1% to 2% CoO, 0.1% to 7% NiO and 1.5% to 5% $MoO_3$ supported on a carrier consisting essentially of alpha alumina containing not more than 15% silica, said carrier having a surface area not greater than ten square meters per gram, wherein the percentages are calculated on the finished catalyst weight.

7. A catalyst as defined in claim 6 wherein the combined weight of cobalt oxide, nickel oxide and molybdenum oxide is between about 2% and about 10% of the total weight of the finished catalyst.

8. A catalyst as defined in claim 7 wherein the alpha alumina is substantially anhydrous.

9. A method of preparing a selective hydrogenation catalyst as defined in claim 1 which comprises applying to particles of a carrier comprising a major proportion of alpha alumina a solution of a soluble compound of cobalt, a soluble compound of nickel and a soluble compound of molybdenum until quantities of said metals are taken up which are equivalent to 0.1% to 2% by weight CoO, 0.1% to 7% by weight NiO and 1.5% to 5% by weight $MoO_3$, heating said treated alpha alumina particles to a temperature above 300° F. to evaporate the solvent and decompose any salts of the metals to oxides thereof supported on the carrier particles, the percentages being calculated on the finished catalyst weight.

10. A method of preparing a selective hydrogenation catalyst as defined in claim 6 which comprises applying to particles of a carrier consisting essentially of alpha alumina containing not more than 15% silica a solution of a soluble compound of cobalt, a soluble compound of nickel and a soluble compound of molybdenum until quantities of said metals are taken up which are equivalent to 0.1% to 2% by weight CoO, 0.1% to 7% by weight NiO and 1.5% to 5% by weight $MoO_3$, heating said treated alpha alumina particles to a temperature above 300° F. to evaporate the solvent and decompose any salts of the metals to oxides thereof supported on the carrier particles, the percentages being calculated on the finished catalyst weight.

11. The method of claim 10 wherein the nickel and cobalt are in the form of water-soluble salts in aqueous solution and the molybdenum is in the form of molybdenum oxide dissolved in an aqueous alkaline solution.

12. A method of selectively hydrogenating acetylenic compounds in a gas containing the same and containing olefins as a major part of the unsaturated hydrocarbons which comprises contacting said gas admixed with hydrogen in excess of the stoichiometric amount required to reduce said acetylenic compounds to olefins with a catalyst as defined in claim 1 at a temperature in the range of 250° to 600° F. and at a pressure in the range of 50 to 400 p.s.i.g. for a period of time sufficient to hydrogenate substantially all of said acetylenic compounds without substantially reducing said olefins.

References Cited in the file of this patent

UNITED STATES PATENTS

| | | |
|---|---|---|
| 2,735,879 | Redcay | Feb. 21, 1956 |
| 2,802,889 | Frevel et al. | Aug. 13, 1957 |
| 2,854,404 | Prater et al. | Sept. 30, 1958 |
| 2,880,171 | Flinn et al. | Mar. 31, 1959 |
| 2,965,583 | Houdry et al. | Dec. 20, 1960 |
| 3,003,008 | Fleming et al. | Oct. 3, 1961 |

FOREIGN PATENTS

| | | |
|---|---|---|
| 203,801 | Australia | Oct. 16, 1956 |